United States Patent [19]

Willis et al.

[11] 4,394,540
[45] Jul. 19, 1983

[54] REMOTE METER READER AND METHOD FOR READING METERS OVER NON-DEDICATED TELEPHONE LINES

[75] Inventors: Alan E. Willis; John R. Lowdenslager, both of Stamford; Neal Goldstein, Middletown, all of Conn.

[73] Assignee: Timex Corporation, Waterbury, Conn.

[21] Appl. No.: 264,723

[22] Filed: May 18, 1981

[51] Int. Cl.³ .......................................... H04M 11/08
[52] U.S. Cl. .......................................... 179/2 AM
[58] Field of Search ............... 179/2 A, 2 AM, 5 R, 179/5 P, 2 DP, 1 MN, 84 C, 175.2 C, 6.07, 6.08, 6.11

[56] References Cited

U.S. PATENT DOCUMENTS

| | | | |
|---|---|---|---|
| 3,551,597 | 12/1970 | Russell | 179/2 AM |
| 3,902,016 | 8/1975 | Blouch | 179/2 A |
| 4,059,727 | 11/1977 | Kingswell et al. | 179/2 AM |
| 4,104,486 | 8/1978 | Martin et al. | 179/2 AM |
| 4,126,762 | 11/1978 | Martin et al. | 179/2 A |

Primary Examiner—G. Z. Rubinson
Assistant Examiner—W. J. Brady

Attorney, Agent, or Firm—William C. Crutcher

[57] ABSTRACT

A meter reader is disclosed for automatically reading utility meters at a telephone subscriber station and transmitting the meter data read to a central office over non-dedicated telephone lines in response to a call initiated by the central office. The meter reader is located at the subscriber station and includes, a microprocessor, a telephone isolating device, a call answering device, a ring detector, an off-hook detector, a ring generator, a data transmitter-receiver device and a modem. Each day the telephone is isolated from the telephone lines for a predetermined data access time. Any call made to the subscriber station during the data access time is answered by the meter reader. A coded signal is sent out over the telephone lines by the meter reader for the purpose of determining the source of the call. If the call is from the central office a coded reply signal is sent back and, the meter reader transmits the data to the central office. If the coded reply signal is not returned, the meter reader generates ringing signals for activating the bell in the subscriber's telephone. If the subscriber telephone is picked up at any time during the data access time, it is immediately unisolated from the telephone line.

19 Claims, 6 Drawing Figures

REMOTE METER READER AND METHOD FOR READING METERS OVER NON-DEDICATED TELEPHONE LINES

BACKGROUND OF THE INVENTION

The present invention relates generally to remote reading of meters and more particularly to a device and method for automatically reading meters at subscriber telephone stations from a remote location, such as a central office, over non-dedicated telephone lines in response to a call initiated by the central office.

Over the last several years a number of different systems have been proposed for automatically reading utility and other types of meters from a remote location for the purpose of eliminating the high labor costs involved in door-to-door meter reading and for providing more up-to-date information. Unfortunately, for one reason or another, none of these systems have come into wide spread use.

Many of these proposed systems have involved using existing, non-dedicated, telephone lines as the communications medium for transferring the meter information and have involved obtaining the information in response to a telephone call initiated by the collecting station. The main advantage of using non-dedicated telephone lines is that it does not require installing additional communication lines. The main advantages of transferring the information pursuant to a call made by the collecting station are that it does not require complex answering equipment at the collecting station to insure that all incoming calls will be answered in an orderly and efficient manner and does not involve the use of selectively operable automatic dialing devices at each one of the locations containing utility meters which are to be read. One of the problems with such systems, however, has been the unavoidable ringing of the telephone at the subscriber station pursuant to the call initiated by the collecting office. In order to avoid this nuisance to the subscriber, a number of different techniques have been suggested.

One such technique involves using special telephone company line test circuits which will not activate the bell in the telephone at the subscriber station for connecting the collecting station with the subscriber station. One of the problems with this technique is that it requires installing additional equipment at the telephone company exchange. Also, the technique requires telephone company approval. An example of a system employing this technique is described in U.S. Pat. No. Re. 26,331 reissued on Jan. 9, 1968, to Brothman et al on original U.S. Pat. No. 3,142,726 dated July 28, 1964.

Another technique involves the use of a ring muting circuit at the telephone subscriber station for muting a portion of the first ring and the use of sequential ringing signals having a different spacing from normal ringing signals for the call from the collecting office. One of the problems with this technique is that it involves complicated circuitry at the central office, and some modification of the circuitry at the telephone exchange and at the subscriber station. Another problem with this technique is that a portion of the first ring on every incoming call is muted, which is rather objectionable. An example of this technique is disclosed in U.S. Pat. No. 4,126,762 issued on Nov. 21, 1978, to Martin et al.

Still aother technique involves disconnecting the subscriber's telephone from the telephone lines for a certain time period each day and then connecting the telephone wires directly to a meter reading device connected to the utility meters during that time period. The meter reading device responds to an incoming call by transmitting out the meter data. One problem with this arrangement in that normal telephone service is completely disrupted for that period. Another problem with this arrangement is that all incoming calls made during that time period, including calls made by parties other than the collecting station, will be connected to and answered by the meter reading device. Once answered, the meter data will be sent out over the telephone lines, even though the caller may not be the collecting station. An example of this arrangement is also disclosed in the above noted U.S. Pat. No. 4,126,762.

A further technique involves the use of switch controlled delaying apparatus at the subscriber station arranged so that when a call is received at the subscriber station it is not connected to the telephone until a sufficient amount of time has elapsed to permit call answering apparatus at the subscriber station to receive a specially coded signal sent between the first ringing signal and the second ringing signal indicating that the call is from the collecting station. One of the objectionable aspects of this technique is that the first ringing signal is suppressed. An example of this arrangement is described in British Pat. No. 905,411 published Sept. 5, 1962, to Kienast.

Other known prior art includes U.S. Pat. Nos. 3,049,592; 3,231,670; 3,266,018; 3,362,971; 3,376,389; 3,508,243; 3,551,597; 3,558,357; 3,564,143; 3,742,142; 3,842,206; 3,868,640; 3,899,639; 3,902,016; 3,922,492; 3,936,617; 3,937,890; 4,002,837; 4,004,097; 4,022,927; 4,059,727; 4,086,434; 4,126,472; 4,151,371; 4,169,290; 4,180,709; 4,241,237; Bell Laboratories Record, Volume 48 No. 4 (1970) pp. 104–109; the American City and County (Dec. 1975) pp. 47–48; and IBM Technical Disclosure Bulletin, (Feb. 1971), Vol. 13, No. 9, pp. 2682–2683.

SUMMARY OF THE INVENTION

It is an object of this invention to provide a method for automatically reading meters at a telephone subscriber station and transmitting the meter readout information to a central office over non-dedicated telephone lines in response to a call initiated by the central office.

It is another object of this invention to provide a meter reader for use in automatically reading, on demand, utility meters at a telephone subscriber station and transmitting the meter data read to a computer at a central office over non-dedicated telephone lines in response to a call initiated by the central office.

It is still another object of this invention to provide a method and meter reader as described above wherein the call initiated by the central office will not cause the telephone at the telephone subscriber station to ring and which will not substantially interfere with normal usage of the subscriber telephone.

It is yet still another object of the invention to provide a method and meter reader as described above with can be used with existing commercial equipment without modification to the telephone lines or the telephone exchange equipment.

It is another object of this invention to provide a method and meter reader as described above that does not interfere with customary meter operations, that is easy to install and that is accurate in obtaining and transmitting meter data.

It is still another object of this invention to provide a novel technique for establishing telephone communications between a computer at a central office and a computer at a telephone subscriber station over non-dedicated telephone lines on a call initiated by the central office without causing the telephone at the telephone subscriber station to ring and without interferring with normal telephone usage of the telephone at the telephone subscriber station.

A method of reading meters at a telephone subscriber station from a central office over non-dedicated telephone lines on a call initiated by the central office without causing the telephone at the subscriber station to ring and without substantially interferring with normal telephone service at the telephone subscriber station according to the present invention comprises providing at said subscriber station a selectively operable meter reader which is coupled in series between said telephone lines and said subscriber telephone, which is connected to said meters and which is capable of answering telephone calls, isolating said subscriber telephone from said telephone lines for a predetermined data access time, initiating a call from said central office to said subscriber station when a meter reading is desired, but only during said data access time, answering the call with said meter reader, confirming that the call received is the call initiated by the central office, and not from another party, and transmitting said meter data to said central office if it is confirmed that said call is from said central office.

A meter reader for reading meters at a telephone subscriber station from a central office over non-dedicated telephone lines on a call initiated by the central office without causing the telephone at the subscriber station to ring and without substantially interferring with normal telephone service at the telephone subscriber station according to the present invention comprises means for selectively isolating said subscriber telephone from said telephone lines for a predetermined data access time, means for detecting a ring generating signal to said subscriber station during said data access time indicating an incoming call, means for answering said call causing thereby said ringing signal to terminate, means for ascertaining if said call is from said central office, and means for collecting meter data from said meters and transmitting said meter data to said central office if said call is from said central office.

BRIEF DESCRIPTION OF THE DRAWINGS

In the drawings wherein like reference numerals represent like parts.

DETAILED DESCRIPTION OF PREFERRED EMBODIMENTS

The present invention is concerned with a system for automatically collecting meter data in a computer in a central office from utility meters at telephone subscriber stations over non-dedicated telephone lines on a call initiated by the central office.

The system is centered around a miroprocessor controlled meter reader which is located at each subscriber station. The meter reader is coupled to the utility meters whose contents are to be read, to the telephone lines and to the telephone at the subscriber station.

The method for carrying out the system involves isolating the telephone at the subscriber station for a predetermined data access time each day, answering all incoming calls during the data access time with the meter reader and arranging to have the central office call the subscriber station for meter readings periodically but only during the data access time. If a call received during the data access time is determined by the meter reader to be from the central office, data signals corresponding to the current meter readings are collected from the meters and are sent out to the central office over the telephone lines. If a call received during the data access time is determined by the meter reader not to be from the central ofice, the telephone is caused to ring through ringing signals generated by the meter reader. At the same time, simulated side-tone signals are generated by the meter reader and sent out over the telephone lines so that the caller will actually hear signals sounding like the ringing of the subscriber's telephone. If the telephone is picked up during the data access time, either to make an outgoing call or in response to the ringing of the telephone bell caused by ringing signals sent out by the meter reader, the off-hook condition is sensed by the meter reader and the telephone is unisolated from the telephone lines. The technique for determining if an incoming call during the data access time is from the central office involves sending a coded signal out over the telephone lines. If the incoming call is from the central office, a coded acknowledgement signal is promptly returned.

At all times other than the data access time, the telephone is unisolated from the telephone lines and is used in the normal manner.

As can be appreciated, the system completely avoids ringing of the subscriber telephone on the call from the central office, but will cause the subscriber telephone to ring in response to all other incoming call either outside of the data access time or during the data access time.

Figure 1:
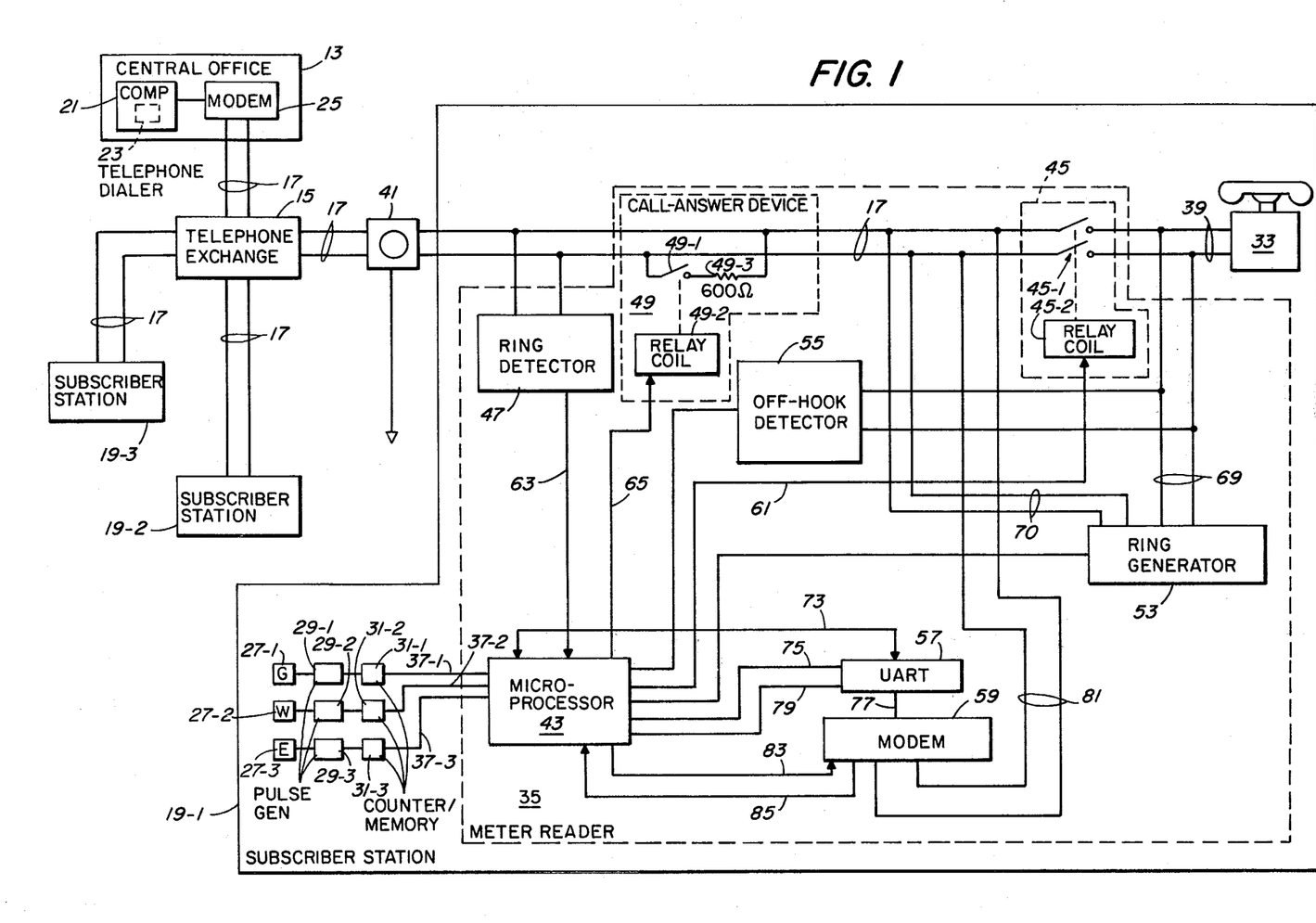
FIG. 1 is a block diagram of a system for remotely reading utility meters incorporating the meter reader of the present invention.

Referring now to the drawings there is illustrated in FIG. 1 a block diagram of an embodiment of an overall system for remotely reading utility meters at telephone subscriber stations over non-dedicated telephone lines according to the present invention and identified generally by reference numeral 11.

System 11 includes a central office 13 for collecting meter data which is connected to a telephone company telephone exchange 15 through telephone lines 17. A plurality of telephone subscriber stations 19-1, 19-2 and 19-3 etc. are also connected to telephone exchange 15 through telephone lines 17, the number of subscriber stations shown being for illustrative purposes only.

Central office 13 includes a computer 21 equipped with a suitable telephone dialing mechanism 23. Computer 21 is coupled to telephone lines 17 through a modem 25 which serves to convert output signals from computer 21 to a form suitable for transmission over telephone lines 17 and to convert incoming signals from telephone lines 17 to a form compatable with computer 21.

Each one of the subscriber stations 19 includes a plurality of utility meters such as a gas meter 27-1, an electric meter 27-2 and a water meter 27-3, each of whose contents it is desired to read. Utility meters 27 are conventional type utility meters which display the amount of the product consumed with a series of dials. Each utility meter 27 is coupled to a pulse generating device labelled 29-1, 29-2 and 29-3 respectively, which converts the dial readings of its meter into pulses. Each pulse generating device 29 is coupled to a counter/memory device labelled 31-1, 31-2 and 31-3 respectively, which counts the number of pulses received from its associated pulse generating device and stores the count in digital form. Pulse generating devices and counter/memories for this purpose are well known in the art and disclosed, for example, in U.S. Pat. No. 3,937,890. If utility meters 27 are digital type meters which include readable memories for storing the meter readings directly in digital form, the pulse generating devices 29 and counter/memories 31 are omitted. Each subscriber station 19 also includes one or more conventional telephones shown in FIG. 1 as a single telephone 33 which is equipped with a ringing device such as a bell (not shown).

Each subscriber station 19 further includes a meter reader 35 constructed according to the teachings of the present invention for controlling the transmission of meter data from counter/memories 31 to the computer 21 at central office 13 and for selectively controlling the operations of telephone 33. Meter reader 35 is coupled to each one of the counter/memories 31 through a separate 8 bit bus labelled 37-1, 37-2 and 37-3 respectively. Meter reader 35 is also connected electrically in series between a pair of telephone lines 17 and a pair of subscriber station lines 39 which are connected to telephone 33 and preferably is connected at a place between a lightning arrestor 41 which may be at subscriber station 19 and telephone 33. Meter reader 35 is physically located at any convenient area on the premises of subscriber station 19.

Meter reader 35 is organized and built around a micro-processor 43 which provides the necessary control and sequencing for the operation of the device and includes the necessary arithmetic and logical functional blocks for operating the device and handling the flow of data from meters 27 to central office 13. In addition to microprocessor 43, meter reader 35 includes a telephone isolating devcie 45, a ring detector 47, a call answer device 49, a ring generator 53, an off-hook detector 55, a UART 57 and a modem 59.

Telephone isolating device 45 is in the form of a relay having a pair of normally closed switches 45-1 and a coil 45-2. Relay switches 45-1 are coupled in series between telephone lines 17 and telephone subscriber lines 39 and connected to coil 45-2. Relay switches 45-1 serve either to isolate telephone lines 17 from telephone 33 or to "unisolate" that is, reconnect, telephone lines 17 to telephone 33 on signals received from microprocessor 43 over line 61. During the time period outside the data access time, relay switches 45-1 are closed and telephone 33 is connected to lines 17 and is used in the normal manner. During the data access time, relay switches 45-1 are opened, isolating telephone 33 from telephone lines 17 and remain open unless closed again to unisolate the subscriber telephone 33 on instructions from microprocessor 43. Ring detector 47 is connected across lines 17 and functions to detect ringing signals over lines 17 which are generated by central office 13 to indicate an incoming call and then send a logical signal indicating this condition to microprocessor 43 over line 63.

Call-answering device 49 answers all incoming calls when relay switches 45-1 are open and includes a relay having a normally open switch 49-1, a coil 49-2 and a resistor 49-3, having a resistance equivalent to that giving an off-hook condition which at the present time with most telephone companies is typically 600 ohms. Relay switch 49-1 is coupled across lines 17 in series with resistor 49-3 and is connected to relay coil 49-2. When a ringing signal is detected by ring generator 47 during the data access time a signal is sent by microprocessor 43 to relay coil 49-2 over line 65 closing relay switch 49-1. This causes an impedance drop across lines 17 in a manner identical to the impedance drop when telephone 33 is picked up (removed from its cradle). This impedance drop is detected by the telephone exchange which responds to the impedance drop by turning off its ring signal generator.

Ring generator 53 is coupled across lines 17 and across lines 39 and generates a 90 volt RMS 20 Hz signal (similar to the ringing signals sent over lines 17 by telephone exchange 15) and a $\frac{3}{4}$ volt RMS 20 HZ signal (similar to the ringing signals heard by a caller when the telephone is ringing at the station called) when instructed to do so on a signal from microprocessor 43 over line 67. The 90 volt RMS 20 HZ signal is sent over lines 69 to telephone 33 over line 39 and causes the bell in telephone 33 to ring. The $\frac{3}{4}$ volt RMS 20 HZ signal is sent out on lines 17 over lines 71 and serves to simulate ringing or sidetone signals to the caller.

Off-hook detector 55 is coupled to lines 39 over lines 56 and serves to detect when telephone 33 is picked up from its cradle, (i.e.) that is, placed in an off-hook condition), at anytime and transmit a status signal of this condition to microprocessor 43 over line 72.

UART 57 takes 8 bit parallel data received from microprocessor 43 over an 8 bit bidirectional bus 73, converts the data into serial form on a signal received from microprocessor 43 over line 75 and then sends the data to modem 59 over line 77. UART 57 also takes serial data received from modem 59 over line 77, converts it into parallel form and sends it back to microprocessor 43 over bus 73 on signals received from microprocessor 43 over line 79. Modem 59 takes serial data from UART 57, converts the data into signals suitable for transmission over telephone lines 17 and transmits the signals to line 17 over lines 81. Modem 59 also receives signals sent over line 81 from lines 17, converts the signals into a form suitable for processing by microprocessor 43 and then send the signals to UART 57 over line 77. From UART 57 these latter signals are sent to microprocessor 43 over bus 73. Modem 59 also sends its carrier signals over lines 17 through lines 81 on signals received from microprocessor 43 over line 83 and sends a signal to microprocessor 43 indicating carrier signals received from modem 25 at central office 13 over lines 81 from lines 17 to microprocessor 43 over line 85. Modem 59 is compatable with modem 25 at central office 13. For example, modem 25 may be an "originate" modem having carrier frequencies of 2025 and 2225 HZ and modem 59 may be an "answer" modem having carrier frequencies of 1070 and 1270 HZ.

Meter reader 35 also includes a power supply (not shown) for supplying the necessary operating power to the various components requiring power.

The microprocessor 43 is programmed to kept the time of day through means known in the art by counting time intervals generated by its internal clock and using these to increment the time of day information stored either in registers or random access memory locations.

In the operation of system 11, meter reader 35 is controlled in response to the time of day clock programmed into microprocessor 43 to isolate a telephone 33 from telephone lines 17 for a predetemined data access time each day. Computer 21 is programmed to initiate a call to subscriber station 19 periodically for the purpose of obtaining meter readings, but only during the data access time. The data access time is preferably chosen for a time which is least likely to inconvenience the subscriber, such as from 2:00 A.M. to 3:00 A.M.

Accordingly, meter reader 35 first determines through microprocessor 43 if a data access time exists. If the data access time does exist, microprocessor 43 checks though off-hook detector 55 to see if telephone 33 is being used by the subscriber. If the telephone 33 is being used, microprocessor 43 simply waits until such use has terminated. If the telephone 33 is not being used, microprocessor 43 opens relay switch 45-1, which is normally closed, isolating telephone 33 from telephone lines 17.

If telephone 33 is picked up by the subscriber at any time during the data access time to make an outgoing call, the condition is immediately detected by off-hook detector 55 and relay switch 45-1 is closed so that the telephone 33 may be used by the subscriber. After the telephone has been used, relay 45-1 is re-opened if the time is still within the data access time.

Any incoming call made during the data access time, including a call which may be made by central office 13, is detected by ring detector 47 and immediately answered by answer-call device 49. As soon as the call is answered, the ringing signals from the telephone exchange 15 are terminated. Since telephone 33 is isolated from telephone lines 17, the ringing signal generated from telephone exchange 15 indicating the incoming call is being made is not detected by telephone 33 and the bell in telephone 33 is not activated.

After a delay of about one second, meter reader 35 sends a confirmation signal out over lines 17. If the call answered is from central office 13 an ackowledgement signal is returned within about one second. The confirmation and acknowledgement signals are generated by the modems at each location. Specifically the confirmation signal is generated by causing modem 59 to turn on its transmission carrier and send its carrier out over lines 17, with the carrier constituting the confirmation signal. If the incoming call is from central office 13, the carrier signal of modem 59 is detected by computer 21, which turns on its modem 25 and sends its transmission carrier out over lines 17, with the carrier from modem 25 constituting the acknowledgement signal. The total time interval during which the confirmation signal is sent and the acknowledgement signal is received is about one second.

If an acknowledgement signal is received by meter reader 35, microprocessor 43 concludes that the call is from the central office 13, collects the meter readings from counter memories 31, converts the 8 bit parallel meter data into serial data in UART 57, and sends the data through modem 59 to central office 13 over lines 17 along with identification data of the particular location of subscriber station 19 which is stored in a memory in microprocessor 43.

If the acknowledgement signal is not returned, microprocessor 43 interprets this to mean that the call is not from central office 13. In this situation, microprocessor 43 promptly actuates ring generator 53 causing it to send out its two signals, one through lines 69 to lines 39 for activating the bell in telephone 33 and the other through lines 70 and lines 17 for simulating ringing side tones over lines 17 so that the caller will hear a ringing sound at his end. Ring generator 53 is needed to send ringing signals to the bell in telephone 33 since, as far as the telephone exchange 15 is concerned the call has already been answered. As is known, once a call has been answered, the ring signal generating circuitry at the telephone exchange is not designed to be reactivated. Furthermore, even if the circuitry could be reactivated, the signals would not reach telephone 33, since telephone 33 is isolated from telephone lines 17. Both signals generated by ring generator 53, are sent out over their respective lines for a sufficient time interval to enable the subscriber to answer the telephone, such as sixty seconds. If the telephone 33 is not answered within that time the ringing and sidetone signals are terminated. The signals are also terminated if telephone 33 is picked as a result of the ringing signals.

If telephone is picked up during the data access time either in response to ringing signals generated by ring generator 53 or for the purpose of making an outgoing call, a signal indicating the off-hook condition is sent by off-hook detector 55 to microprocessor 43 and microprocess 43 responds to this signal by sending a signal over lines 61 to close relay 45-1 and thereby unisolate telephone 33 from telephone line 17.

As can be appreciated, if a call is made to a subscriber station 19 during the data access time by a party other than central office 13, there will be a very small delay period of about two seconds before telephone 33 is caused to ring through ringing signals generated by ring generator 55 and simulated side tones are generated by ring generator 53. During that delay period the caller will only hear a short "beep" corresponding to the outgoing confirmation signal from modem 59. If a call is made by another party during the data access time and at a time when meter reader 35 is in communication with central office, line 17 will be busy and indicated as such to the caller.

If the subscriber picks up telephone 33 during the data access time and while the meter reader 19 is in communication with the central office 13, the transfer of data from meter reader 19 to central office 13 is aborted.

At the end of the data access time, relay switch 45-1 is closed. Meter reader 35 is effectively dormant during the time outside the data access time interval and remains dormant until the start of the data access time the next day.

Figure 2:
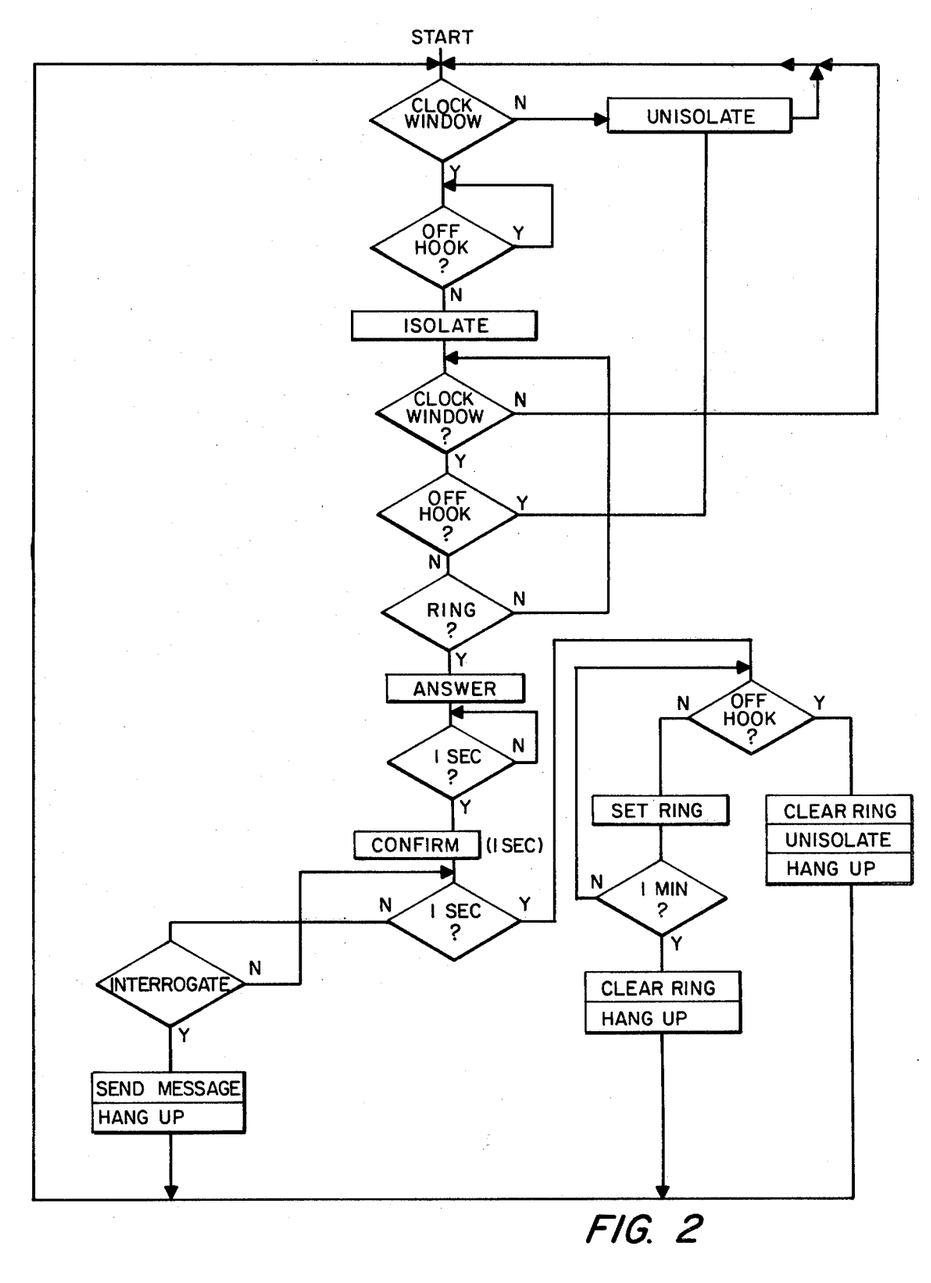
FIG. 2 is a flow chart showing the operation of the system in FIG. 1.

The operation of the system is shown in detail in the flow chart in FIG. 2.

Referring now to FIG. 3, there is illustrated a detailed schematic diagram of another embodiment of a meter reader constructed according to the teachings of the present invention and identified by reference numeral 135. Meter reader 135 performs the same functions and operates in substantially the same manner as meter reader 35 shown in block diagram form in FIG. 1. The main differences in meter reader 135 are that (1) the ring detector circuit is also used to detect an off-hook condition during the time period outside the data access time, (2) a separate off-hook detector is included for detecting an off-hook condition in the data access time period, (3) the UART is omitted and the UART functions are performed instead by the microprocessor, and (4) separate components are included for generating the time of day information signals and storing the address of the subscriber station. In addition, meter reader 135 is shown applied to a three wire telephone system 117 rather than a two wire telephone system as in FIG. 1.

Meter reader 135 includes a microprocessor U8, a telephone isolating circuit 145, a combination off-hook and data access time ring detector circuit 147, a call answer circuit 149, a non-data access time ring generator circuit 153, an off-hook detector circuit 155, a modem assembly 159, an address store 161, a clock 163, a power supply 165 and other associated interconnecting components.

Microprocessor U8 may be, as an example, a National Semiconductor COP420L Single Chip N-Channel Microcontroller and is connected to a 2 MHZ crystal XTAL1 which is coupled in parallel with a resistor R47. Microprocessor U8 performs all the functions performed by microprocessor 43 except for storing the address of the subscriber station and providing the time of day check signals for the data access time and in addition performs all the functions provided for in UART 57. Microprocessor U8 receives time of day clock signals from clock 163, which are sent over line 191 to line 193 and then from line 193 to line 195, subscriber address signals from address store 161 which are sent over line 193 to line 195 and meter data signals which are sent from the meter interface over line 195. Microprocessor U8 also receives status signals from off-hook and ring detector 147 over line 197, from off-hook detector 155 over line 199 through a type D model 4013 flip-flop U7 and data signals from modem assembly 159 over line 201 through a 2N4401 transistor Q5 which is connected in series with a resistor R51. Microprocessor U8 also receives a signal indicating the presence of a carrier signal from the modem at the computer at the central office acknowledge that an incoming call is from the central office over line 203.

Figure 3A:
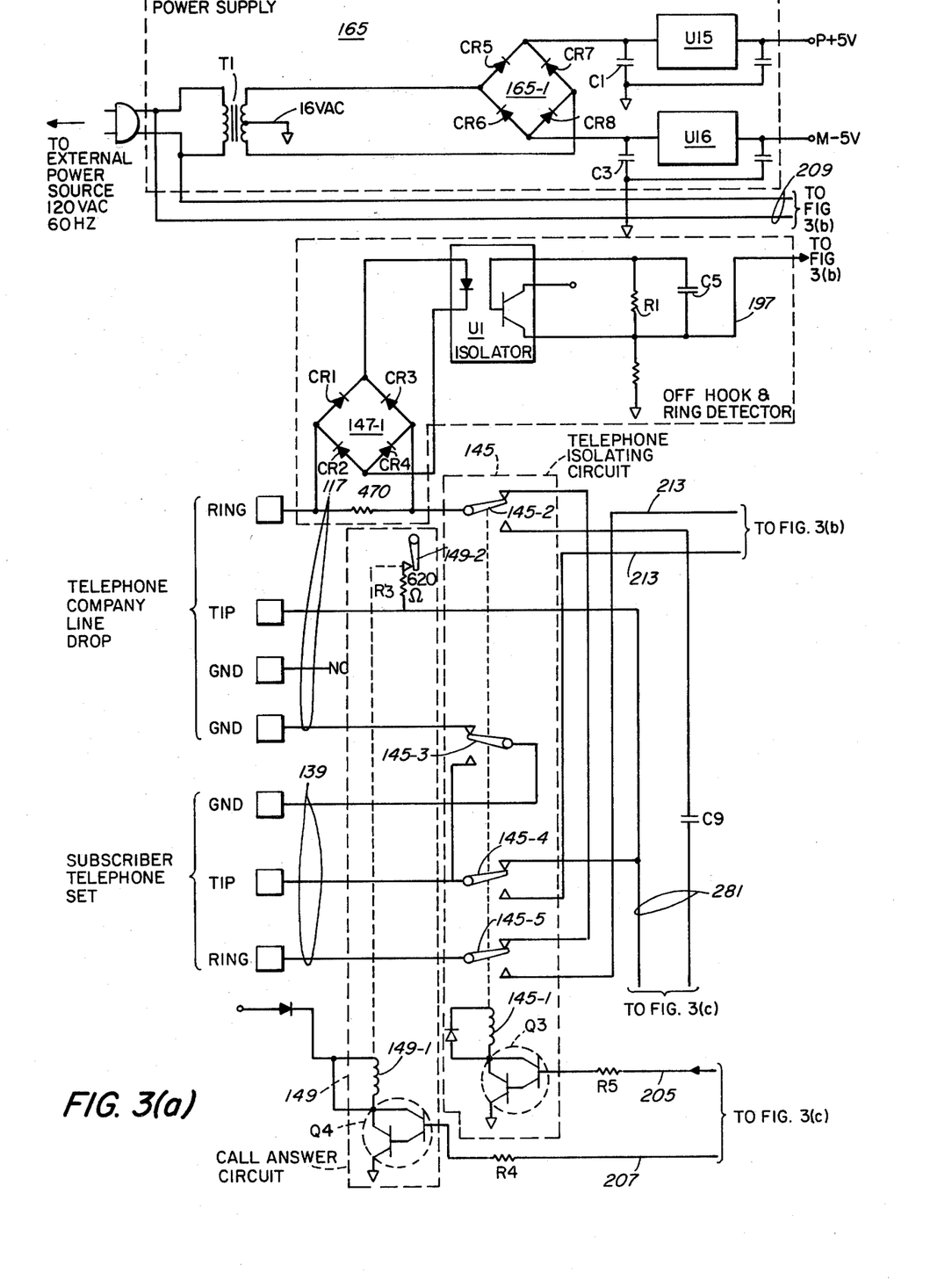
FIG. 3, parts (a), (b), (c) and (d) is a detailed schematic diagram of another embodiment of the meter reader shown in FIG. 1.
Figure 3B:
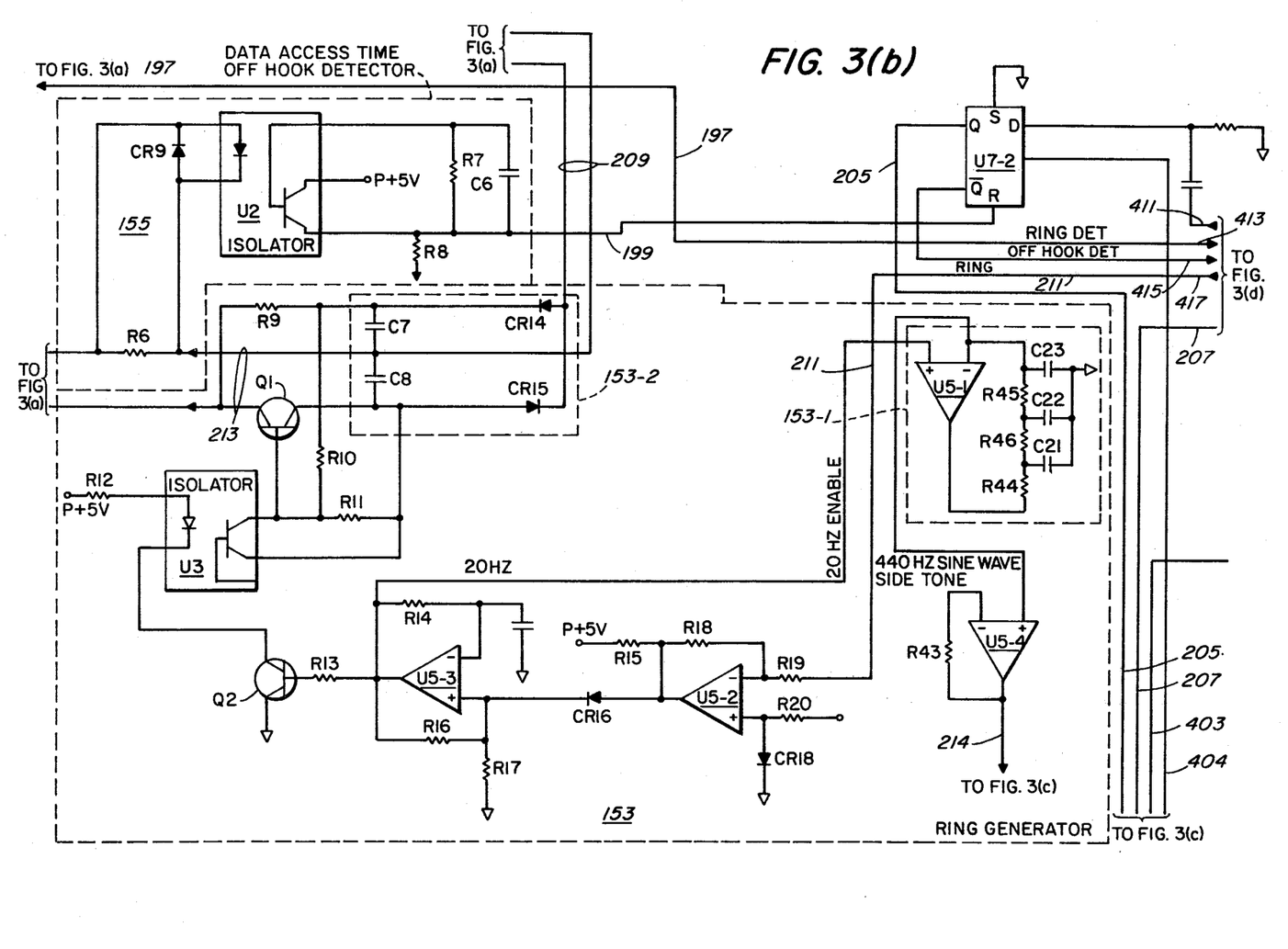
Figure 3C:
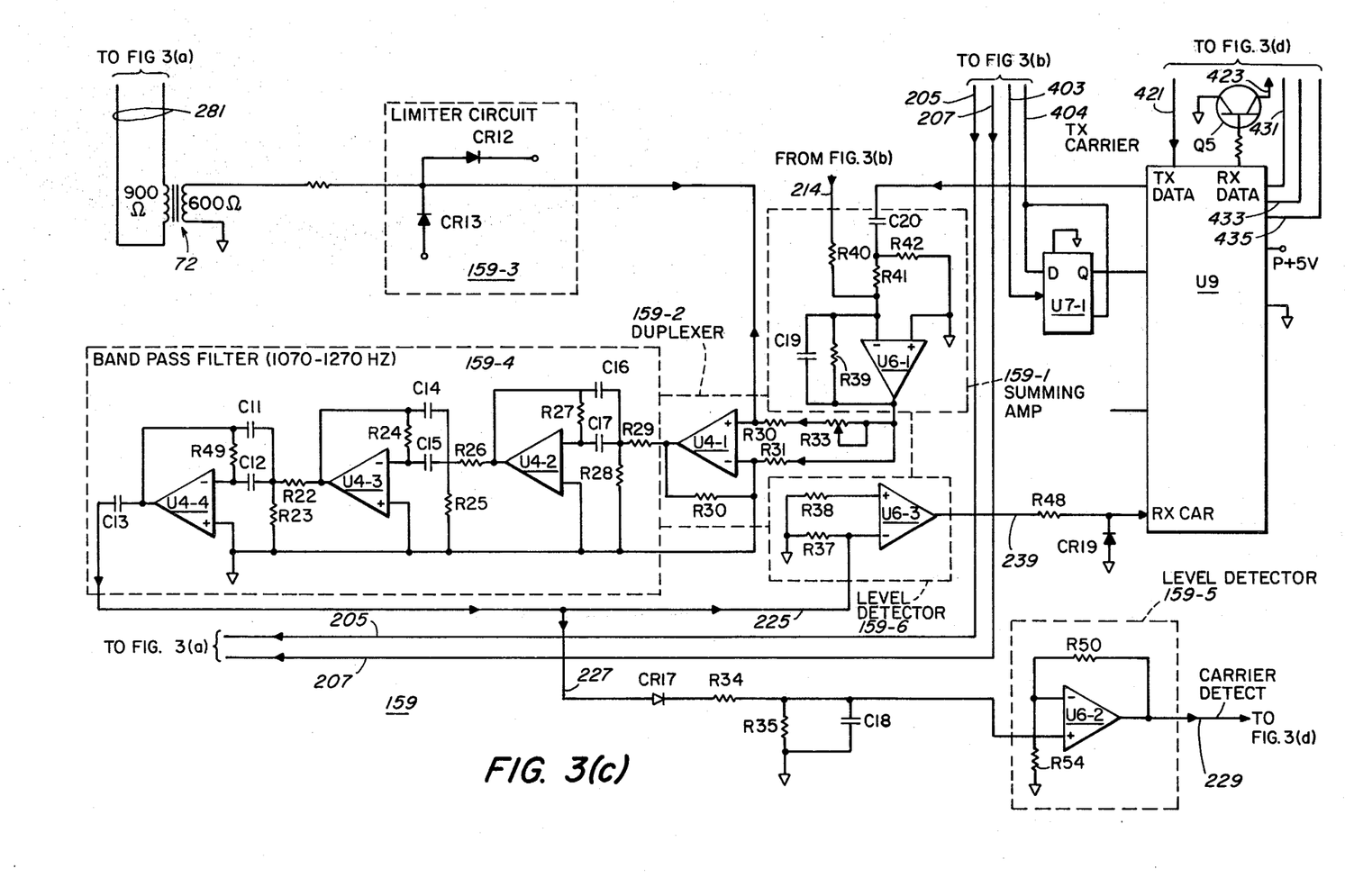
Figure 3D:
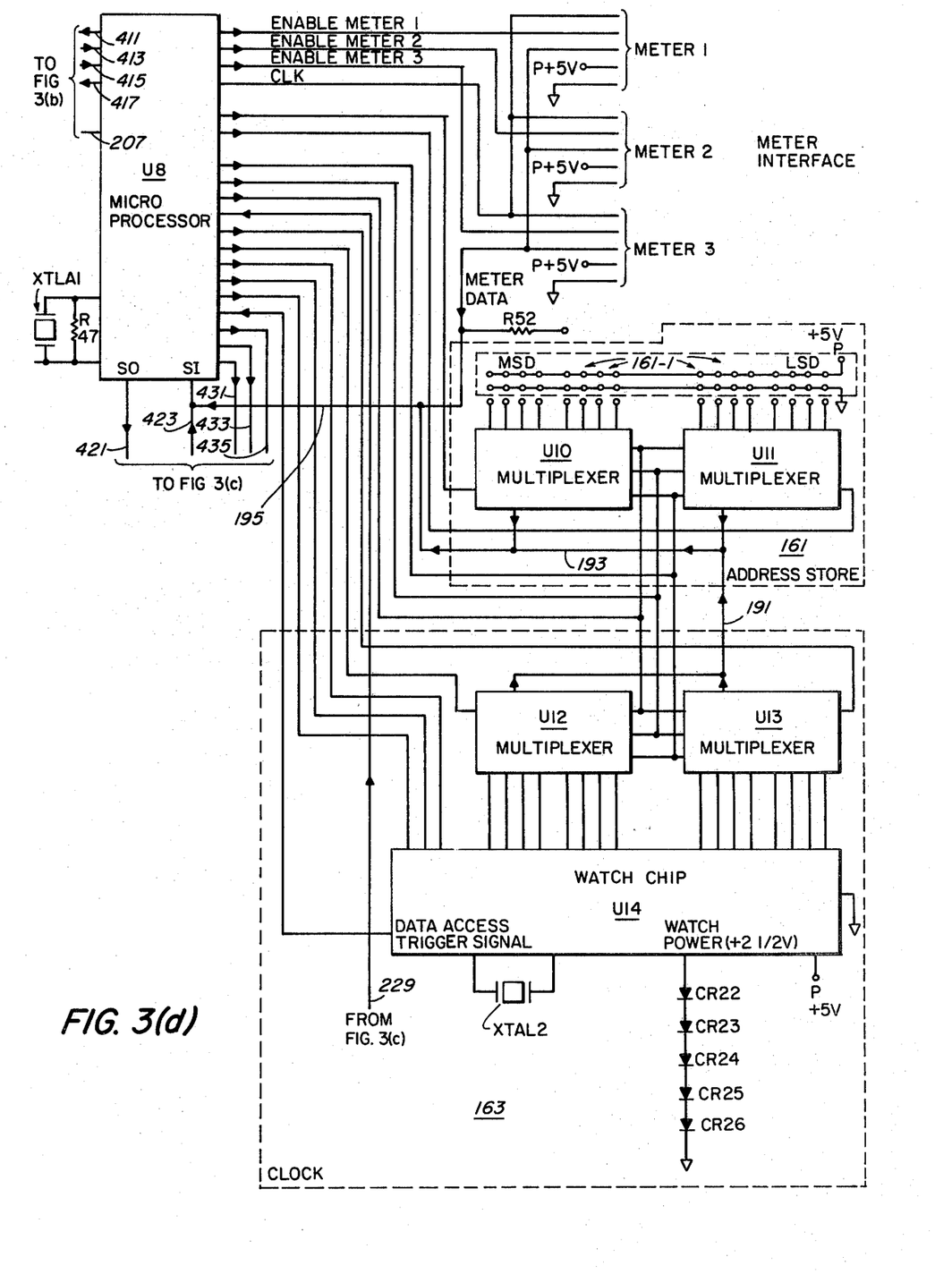

Telephone isolating circuit 145 in FIG. 3(a) performs the same function as telephone isolating device 45, of FIG. 1, namely, to isolate or unisolate the telephone set at the subscriber station from the outside telephone lines 117 on signals received from microprocessor U8 over line 205 through a resistor R5. Telephone isolating circuit 145 includes a relay having a coil 145-1 and a plurality of relay switches 145-2, 145-3, 145-4 and 145-5 and an MPS14 transistor Q3, which functions as a relay driver. When the signal on line 205 is low, relay switches 145-2 through 145-5 are in the position as shown in FIG. 3 and lines 139 connected directly to the telephone set are connected to (i.e. unisolated from) telephone lines 117. On the other hand, when the signal over line 205 is high, transistor Q3 conducts and relay switches 145-2 to 145-5 are moved to the position opposite that shown in FIG. 3 and the telephone set lines 139 are isolated from telephone lines 117.

Off-hook and ring detector 147 is used to detect (1) an off-hook condition at any time in the time period other than during the data access time and (2) a ringing signal indicating an incoming call sent over the telephone lines 117 by the telephone exchange during the time period during the data access time. Detector 147 includes a bridge rectifier circuit 147-1 having four IN914 diodes CR1, CR2, CR3 and CR4, a model number MCT1 line isolator U1 which includes a light emitting diode and a phototransistor and a spike filter circuit comprising a resistor R1, and a capacitor C5 for eliminating noise. The output signal from off-hook and ring detector 147 is sent to microprocessor 147 over line 197. When a ringing signal is sent in from lines 117, it passes through the bridge rectifier circuit 147-1, through the light emitting diode in the isolator U1 where it is sensed by the phototransistor and then sent back through the bridge rectifier circuit 147-1 to switches 145. If switches 145 are in the unisolated position, the signals are sent to the telephone set of subscriber. If switches 145 are in the isolated position, the signals are not sent to the telephone set of the subcriber. When the telephone set is picked up at a time other than during the data access time, the voltage appearing across the line causes a small current to flow through the bridge rectifier circuit, through the diode in line isolator U1 where it is detected by the phototransistor in line isolator U1 and then back through the bridge rectifier circuit 147-1 to telephone lines 117. The purpose of detecting an off-hook condition outside of the data access time is to prevent disconnecting a subscriber which is using the telephone at the start of the data access time.

Call answer circuit 149 is functionally similar to call answer circuit 49 to FIG. 1 and includes a relay having a coil 149-1 and a switch 149-2, a 620 ohm resistor R3 and an MPSA14 transistor Q4. Switch 149-2 is coupled across the ring and tip lines of telephone lines 117 in series with the 600 ohms resistor R3. Transistor Q4 is used as the driver for the relay. When relay switch 149-3 is closed, the 620 ohm resistor R3 is coupled across the telephone lines 117 causing the telephone exchange to terminate the incoming ringing signal. The signal to close relay switch 149-1 is sent to transistor Q4 by microprocessor U8 over line 207.

Ring generator circuit 153 generates a 90 volt 20 cycle signal for activating the bell in the subscriber telephone set and in addition a 440 HZ sine wave signal which is sent out over telephone lines 117 simulating side-tone signals that would be heard by a caller if the bell in the subscriber set were ringing. Both signals are generated on instructions from microprocessor U8 if an incoming call is made during the data access time and it is determined that the call is not from the central office. Ring generator circuit 153 includes an oscillator circuit 153-1, a voltage multiplier circuit 153-2, an MCT2 type isolator U2 and connecting circuitry including resistors R9 through R20 and R43, two IN914 diodes CR16 and CR18, two 2N4401 transistors Q1 and Q2 capacitor C10 a $\frac{1}{4}$M324 op-amp U5-3, a $\frac{1}{4}$LM324 op-amp U5-2 and a $\frac{1}{4}$LM32V op-amp U5-4. Oscillator circuit 153-1 includes an $\frac{1}{4}$LM324 op-amp U5-1 and a filter circuit arranged in negative feedback and including resistors R44, R45 and R46 and capacitors C21, C22 and C23. Voltage multiplier circuit 153-2 includes capacitors C7 and C8 and two IN4004 diodes CR14 and CR15. The 20 cycle signal and the 440 HZ signals are generated from a 120 volt 60 HZ signal received from the external power source over lines 209 and a 20 HZ signal received from microprocessor U8 over line 211. The 20 HZ signal is sent initially through op-amps U5-2 and U5-3. From op-amp U5-3 one portion, which is used to generate the 440 HZ side tone signal, is fed into the positive input of a $\frac{1}{4}$LM324 op-amp in oscillator circuit 153-1. The output signal from oscillator circuit 153-1 is fed into the positive input of op-amp U5-4 whose output is connected to modem assembly 159. The other portion of the signal output signal of op-amp U5-3, which is used to generate the 20 cycle ringing signal, is sent to transistor Q2, from transistor Q2 to isolator U3 and from isolator U3 to transistor Q1 and voltage multiplier circuit 153-2 and from there to the tip and ring lines of the telephone subscriber set over lines 213.

Off-hook detector circuit 155 includes an MCT2 isolator U2 identical to isolator U1 in off-hook and ring detector 149 and associated componentry including a resistor R6, an IN914 diode CR9, resistors R7 and R8 and capacitor C6. Off-hook detector circuit 155, functions to detect an off-hook condition in the telephone at the subscriber station during the data access time and sends a signal indicating this condition to microprocessor U8 over line 199 through flip-flop U7. A separate off-hook detector is needed for operation during the data access time since there is no current flowing through the telephone set lines 139 when the telephone set is isolated and hence no current change when the telephone set is placed from an on-hook to an off-hook condition. Off-hook detector circuit 155 applies a small voltage across telephone set lines 139 during the data access time so that when the telephone set is placed in an off-hook condition a small current change will occur, and operate the telephone isolating circuit 145 through microprocessor U8.

Modem assembly 159 performs the same functions as modem 59 and includes a modem U9, a divide-by-two flip-flop U7, a summing amplifier circuit 159-1, a duplexer circuit 159-2, a limiter circuit 159-3, an isolation transformer T2, a bandpass filter 159-4 and two level detector circuits 159-5 and 159-6. Modem U9 may be a Motorola Universal Low Speed Modem model number MC14412 having transmitter carrier frequencies of 2025 and 2225 HZ.

Summing amplifier circuit 159-1 includes a ¼LM324 op-amp U6-1 resistors R39, R40 and R41 and capacitors C19 and C20. Duplexer circuit 159-2, which is coupled to the output of op-amp U6-1, includes a ¼LM324 op-amp U4-1 and resistors R29, R30, R31, R32 and R33. Limiter circuit 159-3, which is coupled to the positive input of op-amp U4-1, includes two IN414 diodes CR12 and CR13. Band pass filter circuit 159-4 which is coupled to the output of op-amp U4-1 includes three ¼LM324 op-amps U4-2, U4-3 and U4-4, resistors R22 through R29 and R49 and capacitors C11 through C16. Band pass filter circuit 159-4 has a pass band of 1070–1270 HZ, which is equal to the upper and lower transmitting carrier frequencies of the modem at the central office. Level detector circuit 159-5 is coupled to the output of band-pass filter circuit 159-4 and includes a ¼LM324 op-amp U6-2 and a pair of resistors R50 and R54. Level detector circuit 159-6 is also coupled to the output of band-pass filter circuit 159-4 and includes a ¼LM324 op-amp U6-3 and a pair of resistors R37 and R38. The output of level detector 159-5 is connected to microprocessor U8 through line 229 and the output of level detector circuit 159-6 is connected to the RX carrier terminal of modem U9 through line 23.

The 440 HZ sidetone signal from ring generator 153 is fed into the negative input of op-amp U6-1 in summing amplifier circuit 159-1 through resistor R40. The output signal from op-amp U6-1 is transmitted over line 215 through limiter circuit 159-3 to the 600 ohm side of the transformer T2. The resulting signal appearing on the 900 ohm side of transformer T2 is sent out over the ring and tip lines of telephone lines 117.

All outgoing data signals are sent from microprocessor U8 to modem and U9 and then from modem U9 to the negative input of op-amp U6-1 in summing amplifier circuit 159-1 through capacitor C20 and resistor R41. From there, they travel along the same path as the 440 HZ sidetone signal. The outgoing transmitter carrier signals from modem U9 for ascertaining if an incoming call is from the central office also travel the same path.

Incoming data signals along with the transmitter carrier (acknowledgement) signal from the modem in the central office received over lines 117 are sent to the 300 ohm side of transformer T2. From the 900 ohm side of transformer T2, the signals are passed through limiter circuit 159-3 to the positive input of op-amp U4-1 in duplexer circuit 159-2. The output of op-amp U4-1 is passed through band-pass filter 1594 and then split into two parts. One part, which is used to detect the presence of the transmitting carrier from the modem at the central office, is sent along line 227 to level detector 159-5. The other part, which is used to send the incoming data to modem U9, is transmitted over line 225.

Address store 161 includes a pair of 4051 type multiplexers U10 and U11 and a series of switches 161-1. When instructed to do so by microprocessor U8, multiplexers U10 and U11 scan switches 161-1 containing the address of the subscriber station and send the data to the microprocessor U8 over line 195.

Clock 163 which supplies time of day and timing signals to microprocessor U8 over lines 191, 193, and 195 includes a conventional watch chip U14, such as an Intersil 1159H, and a pair of multiplexers U12 and U13. Time of day signals received by multiplexers U12 and U13 from watch chip U14, are sent to microprocessor 143 over line 191 through lines 193 and 195.

Of course, the time of day information signals can also be generated by programming the microprocessor and adding a random access memory to store the time of day information for retrieval by a suitable software subroutine added to the microprocessor control program. The subrouting could also include provisions for setting or updating the time of day through signals over the telephone line from the central office and also for changing the data access time. The use of a watch chip is simply a convenience in the present embodiment for providing time of day information signals from a conventional and readily available component.

Power supply 165 includes an IN4001 bridge rectifier circuit 165-1 made up of four diodes CR5, CR6, CR7 and CR8, a first regulator circuit made up of an LM341P regulator U15 and two capacitors C1 and C2 and a second regulator circuit made up of an LM320L regulator and two capacitors C3 and C4. The output P of first regulator circuit is +5 V and the output M of second regulator circuit is −5 V.

Meter reader 135 operates to substantially the same manner as meter reader 35.

During the time period other than the data access time, there is no signal over line 205, the switches in relay 145 are in the position as shown and the subscriber telephone set is connected to (unisolated from) the telephone lines 171. If the subscriber telephone is placed in an off-hook condition at the time when the data access time commences, this condition is detected by the off-hook and ring detector 149 and a signal indicating this is sent to microprocessor 143 over line 197.

At the start of the data access timd, if the subscriber telephone is not in use a signal is sent from microprocessor U8 over line 201 to flip-flop U7-2. The Q output from flip-flop U7-2 is connected via line 205 to relay Driver Q3 which causes switches 245 to switch to the position opposite to that shown, isolating thereby the subscriber telephone from the telephone lines 171. if an incoming call is made during the data access time, the ringing signal from the central office is detected by off-hook and ring detector 147 and a signal to this effect is sent to microprocessor 143 over line 197. After a one second delay, microprocessor 143 causes modem U9 to send its carrier signal frequencies through summing amplifier 159-3 to the duplexer circuit 159-4, from the duplexer circuit 159-4 to the 600 ohm side of isolation transformer T2 and then from the 900 ohm side of isolation transformer T2 out over lines 117. If the call is from the central office, the computer there will detect the carrier signals and cause its modem to send it transmitting carrier signals over the telephone lines 117. The returned signals will pass through isolation transformers T2, through duplexer circuit 159-4, through band-pass filter circuit 159-8 which is connected microprocessor U8 within about two seconds. If the signal is detected, microprocessor U8 will send the meter data out over lines 117. If the incoming call is not from the central office there will be no return signal. In this case, microprocessor will cause the telephone to ring with ringing signals generated in ring generator 153 and send side tone signals also generated in ring generator 153 out over lines 117 through lines 153. Off hook detector 155 will sense when the telephone is picked up and cause telephone lines 139 to be unisolated.

Typical values in ohms for the resistors in meter reader 135 maybe as follows:

| R1 - 10M | R21 - 620 | R41 - 100K |
|---|---|---|
| R2 - 1M | R22 - 8870 | R42 - 1M |
| R3 - 620 | R23 - 2550 | R43 - 10M |
| R4 - 30K | R24 - 237K | R44 - 39K |
| R5 - 30K | R25 - 1240 | R45 - 390K |
| R6 - 33 | R26 - 21.5K | R46 - 3.9M |
| R7 - 10M | R27 - 165K | R47 - 10M |
| R8 - 1M | R28 - 845K | R48 - 20K |
| R9 - 5K | R29 - 15K | R49 - 97.6K |
| R10 - 82K | R30 - 12K | R50 - 100K |
| R11 - 3.3K | R31 - 12K | R51 - 10K |
| R12 - 75 | R32 - 470 | R52 - 100K |
| R13 - 1K | R33 - 2K | R53 - 1MEG. |
| R14 - 2.4M | R34 - 150K | R54 - 33K |
| R15 - 10K | R35 - 1.5M | |
| R16 - 10K | R36 - 680 | |
| R17 - 10K | R37 - 2K | |
| R18 - 20K | R38 - 2K | |
| R19 - 10K | R39 - 820K | |
| R20 - 10K | R40 - 200K | |

Typical value in microfarads, unless otherwise stated, for the capacitors in meter reader 135 may be as follows:

| C1 - CA 470/35 | C15 - .01 |
|---|---|
| C2 - CA 22/16 | C16 - .01 |
| C3 - CA 220/35 | C17 - .02 |
| C4 - CA 22/16 | C18 - .02 |
| C5 - .1 | C19 - 180 Picofarads |
| C6 - .05 | C20 - .01 |
| C7 - 5 | C21 - .02 |
| C8 - 5 | C22 - 2000 Picofarads |
| C9 - .47 | C23 - 200 Picofarads |
| C10 - .02 | C24 - .02 |
| C11 - .01 | |
| C12 - .01 | |
| C13 - .01 | |
| C14 - .01 | |

All diodes may be model number IN914.

It is to be understood that although the invention has been described specifically with reference to utility meters is is obviously also applicable to and usable with meters monitoring consumption of products other than gas, water and power or monitoring services, such as TV usage meters, which may be at a telephone subscriber station. Also, the data access time may be arranged to occur on a weekly or monthly bases etc., rather than on a daily basis and may be for intervals greater than or smaller than the one hour interval between 2:00 A.M. and 3:00 A.M. described above.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method of transmitting meter data to a central office from meters at a telephone subscriber station over non-dedicated telephone lines in response to a call initiated by said central office and without actuating the ringing device in the subscriber telephone at the telephone subscriber station, the method comprising:
   a. providing at said subscriber station a selectively operable meter reader, said meter reader being coupled in series between said telephone line and said subscriber telephone, being connected to said meter, being capable of answering telephone calls and having clock means keeping time of day,
   b. isolating said subscriber telephone from said telephone lines for a predetermined data access time,
   c. answering any call received with said meter reader when said subscriber telephone is isolated,
   d. confirming that the call received is the call initiated by the central office, and
   e. transmitting meter data to said central office if it is confirmed that said call is from said central office.

2. The method of claim 1 and further including unisolating said subscriber telephone from said telephone lines whenever said subscriber telephone is placed in an off-hook condition.

3. The method of claim 1 and wherein isolating said subscriber telephone for a predetermined data access time is initiated and terminated by said clock means.

4. The method of claim 1 and further inlcluding generating signals for activating the ringing device in said subscriber telephone for a defined time interval if said call is not from said central office.

5. The method of claim 4 and further including generating sidetone signals simulating ringing signals and sending said sidetone signals over said telephone lines at the same time as signals are generated for activating the ringing device in said subscriber telephone if the call received by the meter reader during said data access time is determined not to be a call from said central office.

6. The method of claim 1 and wherein confirming if the call answered within the data access time is a call initiated from the central office comprises sending a coded confirmation signal out over said telephone lines and then monitoring said telephone lines for a return coded acknowledgement signal from the central office.

7. The method of claim 6 and wherein said meter reader and said central office each include a modem and wherein said coded signals are the transmitting carrier signals of the modems.

8. The method of claim 1 and wherein isolating said subscriber telephone from said telephone lines comprises electrically disengaging said subscriber telephone from said telephone lines.

9. The method of claim 1 and wherein answering calls received during said data access time comprises coupling a fixed resistance across said telephone lines simulating an off-hook condition.

10. The method of claim 9 and wherein answering all calls received during said data access time includes detecting the presence of a ringing signal over said telephone lines prior to placing said fixed resistance across the telephone lines.

11. The method of claim 1 and wherein isolating said telephone from said telephone lines during said predetermined data access time if said subscriber telephone is not in use includes monitoring said subscriber telephone continuously for an off-hook condition.

12. The method of claim 1 and wherein transmitting said data from said meter to said central office includes converting said data to a form suitable for transmission over said telephone lines.

13. A meter reader adapted to be connected at a telephone subscriber station in series between the telephone lines connected to the subscriber station and a subscriber telephone and coupled to a meter at said subscriber station for use in transmitting data signals from said meter over said telephone lines to a central office on a call initiated by said central office, said subscriber at said subscriber station including a ringing device, said meter reader comprising:
   a. means for selectively isolating said subscriber telephone from said telephone lines during a predetermined data access time,
   b. means for detecting a ringing signal to said subscriber station during said data access time indicating an incoming call,
   c. means for answering said call, causing thereby said ringing signal to terminate,
   d. means for ascertaining if said call is from said cental office, and
   e. means for transmitting said data signals to said central office, if said call is from said central office.

14. The meter reader of claim 13 and further including clock means adapted to initiate and terminate said data access time.

15. The meter reader of claim 13 and further including means for generating a ringing signal for activating said ringing device in said telephone if said incoming call is not from said central office.

16. The meter reader of claim 13 and further including off-hook detector means for detecting if said telephone is placed off-hook.

17. A meter reader adapted to be connected at a telephone subscriber station in series between non-dedicated telephone lines and a telephone and coupled to a meter at said subscriber station for use in transmitting data signals from said meter over said telephone lines to a central office on a call initiated by said central office without substantially interfering with normal telephone service said telephone at said subscriber station including a bell, said meter reader comprising:
   a. a microprocessor,
   b. telephone isolating means operable in response to control signals from said microprocessor for isolating said telephone from said telephone line for a predetermined data access time,
   c. ring detector means coupled to said telephone line for detecting ringing signals to said telephone during said data access time and sending a signal in response thereto to said microprocessor,
   d. call answering means for answering incoming calls during said data access time,
   e. transmission means for transmitting data signals from said meter over said telephone lines,
   f. ring generator means for generatng signals for activating the bell in the telephone at the subscriber station and simulated side tone signals during said data access time, and
   g. off-hook detector means for detecting an off-hook condition.

18. A meter reader adapted to be connected at a subscriber station in series between a telephone line and a telephone at a said subscriber station and coupled to a digital utility meter at said remote station for use in transmitting digitally encoded data signals from said meter over said telephone line to a central office in response to a call initiated by said central office, said telephone at said subscriber station including a ringing device, said meter reader comprising:
   a. a microprocessor,
   b. a telephone isolating device responsive to signals from said microprocessor for selectively isolating said telephone from said telephone line for a predetermined data access time,
   c. a ring detector for detecting a ringing signal indicative of an incoming call when said telephone is isolated from said telephone line,
   d. means for ascertaining if said incoming call is from said central office,
   e. an answer call device responsive to signals from said microprocessor for causing an incoming call to be answered during said data access time when said telephone is isolated,
   f. transmission means for transmitting data and status signals between said microprocessor and said central office if said call is from said central office, and
   g. an off-hook detector for detecting an off-hook condition.

19. A data sensing and collection system comprising:
   a. a central office,
   b. a plurality of subscriber stations, and
   c. a telephone line connecting said central office to each one of said subscriber stations,
   d. said central office including a computer having a telephone dialing mechnaism,
   e. each of said subscriber stations including:
      i. a telephone having a bell,
      ii. a meter reader connecting said telephone to said telephone line, and
      iii. a source of digital data which is to be read coupled to said meter reader, said meter reader including:
         I. means for selectively isolating said telephone at said subscriber station within a predetermined data access time,
         II. means for detecting an incoming call ringing signal to said telephone at said subscriber station during said data access time,
         III. means for answering said call so as to cause said ringing signal to terminate,
         IV. means for ascertaining if said incoming call is from said central office,
         V. means for transmitting said digitally encoded data signals to said central office if said incoming call is from said central office,
         VI. means for activating said bell in said telephone if said incoming call is not from said central office, and
         VII. means for detecting an off-hook condition of said telephone at any time.

* * * * *